United States Patent
Kohler et al.

(10) Patent No.: US 10,210,661 B2
(45) Date of Patent: Feb. 19, 2019

(54) LOCATION-BASED HOLOGRAPHIC EXPERIENCE

(71) Applicant: Microsoft Technology Licensing, LLC, Redmond, WA (US)

(72) Inventors: Jeffrey Kohler, Redmond, WA (US); Shawn Crispin Wright, Sammamish, WA (US); Michael W. McManus, Kirkland, WA (US); Anthony Ambrus, Seattle, WA (US); James Dack, Seattle, WA (US); Craig Lee Hoffman, Sammamish, WA (US); Alexander James Hogan, Mountlake Terrace, WA (US); Korey Krauskopf, Seattle, WA (US); Andrew Zibits, Bothell, WA (US); Todd Alan Omotani, Redmond, WA (US); Jason Bradley Scott, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/137,960

(22) Filed: Apr. 25, 2016

(65) Prior Publication Data

US 2017/0307888 A1 Oct. 26, 2017

(51) Int. Cl.
  *G06T 19/00* (2011.01)
  *G02B 27/01* (2006.01)
  *G02B 27/00* (2006.01)

(52) U.S. Cl.
  CPC ........ *G06T 19/006* (2013.01); *G02B 27/0093* (2013.01); *G02B 27/017* (2013.01);
  (Continued)

(58) Field of Classification Search
  CPC .... A61M 2205/507; G03H 2001/0088; G03H 2227/02; G03H 2240/62; G03H 1/0005;
  (Continued)

(56) References Cited

U.S. PATENT DOCUMENTS

| | | |
|---|---|---|
| 7,190,496 B2 | 3/2007 | Klug et al. |
| 7,372,451 B2 | 5/2008 | Dempski |

(Continued)

FOREIGN PATENT DOCUMENTS

CN 204009229 U 12/2014

OTHER PUBLICATIONS

Etherington, Darrell, "Microsoft Reveals Windows Holographic, An Augmented Reality User Interface for the World", Published: Jan. 21, 2015 Available at: http://techcrunch.com/2015/01/21/microsoft-reveals-windows-holographic-an-augmented-reality-user-interface-for-the-world/.

(Continued)

*Primary Examiner* — Vinh T Lam
(74) *Attorney, Agent, or Firm* — Alleman Hall Creasman & Tuttle LLP (57) ABSTRACT

Examples disclosed herein relate to providing a location-based holographic experience. One example provides a head-mounted display device comprising a see-through display, one or more position sensors, a logic subsystem, and a storage subsystem comprising instructions executable by the logic subsystem to obtain data representing a plurality of holographic objects, acquire sensor data via the one or more position sensors to monitor a position of the head-mounted display device along a path of a holographic experience, detect that the position of the head-mounted display device meets a first position-based condition regarding a first holographic object, and display the first holographic object at a corresponding location for the first holographic object.

20 Claims, 8 Drawing Sheets

(52) U.S. Cl.
CPC ............... *G02B 2027/014* (2013.01); *G02B 2027/0138* (2013.01); *G02B 2027/0174* (2013.01)

(58) Field of Classification Search
CPC ............. G03H 1/2249; G03H 2226/05; G03H 2001/0061; G03H 1/2294; G03H 2226/02; G03H 2001/2284; G02B 5/32; G02B 6/2848; G02B 6/4204; G02B 27/0944; G02B 2027/0174; G02B 2027/14; G02B 2027/0138; G02B 2027/0187; G02B 27/0103; G02B 27/0172; G02B 27/0123; G02B 27/0178; G02B 2027/0123; G02B 2027/0178; G06K 7/10663; G06K 7/1094; G06K 19/16; G06K 2207/1015; A63F 2250/302; A63F 13/12; A63F 2300/8082; H01Q 19/067; G01J 1/0407; G01J 3/1838; G01J 2003/452; G01J 5/0803; H04L 29/06034; H04L 65/4015; H04L 67/08; H04L 29/06401; H04L 29/08126; H04L 67/38; H04N 7/157; H04N 13/0011; H04N 21/4437; H04N 5/2723; H04N 2201/3245; H04N 2213/008; H04N 13/0014; H04N 13/0278; G06T 13/40; G06T 19/006; G06T 19/00; G05B 2219/32246; G05B 2219/36432; G05B 2219/40131; G06N 3/006; A61B 2090/365; G06Q 30/00; G06Q 30/0261; G06Q 30/08; G09G 3/003; G09G 2354/00; G09G 2340/12; G09G 2340/01; G09G 2370/022; G09G 2380/14; G09G 5/14; G09G 5/377; G09G 5/12; G09G 2370/16; G03B 17/54; G06F 3/017; G06F 3/011; G06F 3/1431; G06F 3/013; G06F 3/14; G06F 9/4446; G06F 19/3406; G06F 19/10; G06F 3/1454; G01S 5/163

USPC ............................. 345/7, 8, 633; 706/10, 45
See application file for complete search history.

(56) References Cited

U.S. PATENT DOCUMENTS

| | | | |
|---|---|---|---|
| 8,427,396 B1 | 4/2013 | Kim | |
| 9,030,495 B2 | 5/2015 | McCulloch et al. | |
| 9,846,968 B2* | 12/2017 | Tomlin | G06T 19/006 |
| 2012/0008003 A1 | 1/2012 | Lim et al. | |
| 2013/0321255 A1 | 12/2013 | Lamb et al. | |
| 2014/0002442 A1* | 1/2014 | Lamb | G06F 3/1431 |
| | | | 345/419 |
| 2014/0049559 A1 | 2/2014 | Fleck et al. | |
| 2014/0071163 A1 | 3/2014 | Kinnebrew et al. | |
| 2014/0160162 A1 | 6/2014 | Balachandreswaran et al. | |
| 2014/0313225 A1 | 10/2014 | Lee et al. | |
| 2014/0368537 A1* | 12/2014 | Salter | G06T 19/006 |
| | | | 345/633 |
| 2015/0277116 A1 | 10/2015 | Richards et al. | |
| 2015/0356779 A1* | 12/2015 | Osterhout | G06F 3/012 |
| | | | 345/633 |
| 2016/0140766 A1* | 5/2016 | Balachandreswaran | |
| | | | G06T 19/006 |
| | | | 345/633 |
| 2016/0217612 A1* | 7/2016 | Petill | G06T 19/006 |
| 2016/0371886 A1* | 12/2016 | Thompson | G02B 27/0172 |
| 2017/0025091 A1* | 1/2017 | Haddick | G09G 5/02 |
| 2017/0052507 A1* | 2/2017 | Poulos | G06T 19/006 |
| 2017/0052595 A1* | 2/2017 | Poulos | G02B 27/0103 |
| 2017/0053042 A1* | 2/2017 | Sugden | G02B 27/0179 |
| 2017/0068213 A1* | 3/2017 | Rhee | G06F 3/011 |

OTHER PUBLICATIONS

Hsu, et al., "Augmented Reality on a Dot Matrix Hologram", In Proceedings of 6th International Conference on New Trends in Information Science and Service Science and Data Mining, Oct. 23, 2012, pp. 23-26.

* cited by examiner

LOCATION-BASED HOLOGRAPHIC EXPERIENCE

BACKGROUND

Holographic display systems, such as head-mounted display systems, may be configured to present holographic imagery to a user to provide an immersive virtual or augmented reality experience.

SUMMARY

Examples disclosed herein relate to providing a location-based holographic experience. One example provides a head-mounted display device comprising a see-through display, one or more position sensors, a logic subsystem, and a storage subsystem comprising instructions executable by the logic subsystem to obtain data representing a plurality of holographic objects, acquire sensor data via the one or more position sensors to monitor a position of the head-mounted display device along a path of a holographic experience, detect that the position of the head-mounted display device meets a first position-based condition regarding a first holographic object, and display the first holographic object at a corresponding location for the first holographic object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Augmented reality display devices allow the presentation of holographic experiences comprising the display of virtual objects superimposed over views of real world-objects/locations. As described in more detail below, such devices may be utilized to present an interactive, location-based holographic experience in which a real-world experience space navigable by users is combined with holographic content associated with locations in the experience space. In some examples, such holographic content may take the form of holographic objects that provide guidance information to users along one or more paths from a beginning location to an end location of the holographic experience. Holographic objects also may be used to augment the appearance of the experience space and real-world objects within the holographic experience. Holographic objects in an experience space may be displayed to individual users when an augmented reality display device of a user is determined to satisfy location and/or position-based conditions. Further, such holographic objects may be dynamically updated based upon changes in user location/position in an experience space, and/or based upon user interactions performed during the holographic experience. Further, an experience space associated with the holographic experience may include features configured to enhance the holographic experience. For example, the experience space may include physical output devices that are configured to output physical effects to accompany the display of selected holographic objects.

The combination of dynamically adaptable virtual content with accompanying physical effects may enable the presentation of holographic experiences that are immersive, interactive, reactive, and even personalized. For example, a holographic experience may be presented as an attraction in which groups of guests may walk through for entertainment, where each guest is provided with a wearable augmented reality display device linked to a system server device. Each group of guests, and even individual guests in a group, may be provided with customized holographic objects guiding the guests throughout the attraction. As another example, a holographic experience may be presented as an educational tour of a location (e.g. a museum, historical building), where each tourist may be guided on a tour of the location enriched with relevant details about objects throughout the location. As yet another example, a holographic experience may comprise a synchronized multi-player game in a shared area, where players are guided by tasks and/or objectives and interactive game objects are presented as holographic objects. In each of these scenarios, a system may coordinate the movement and holographic experiences of all users within the environment by monitoring the location of each user and providing individualized guidance information to direct each user to an appropriate location. It will be understood that these scenarios are described for the purpose of example, and a location-based holographic experience may be provided in any other suitable scenario.

Figure 1:
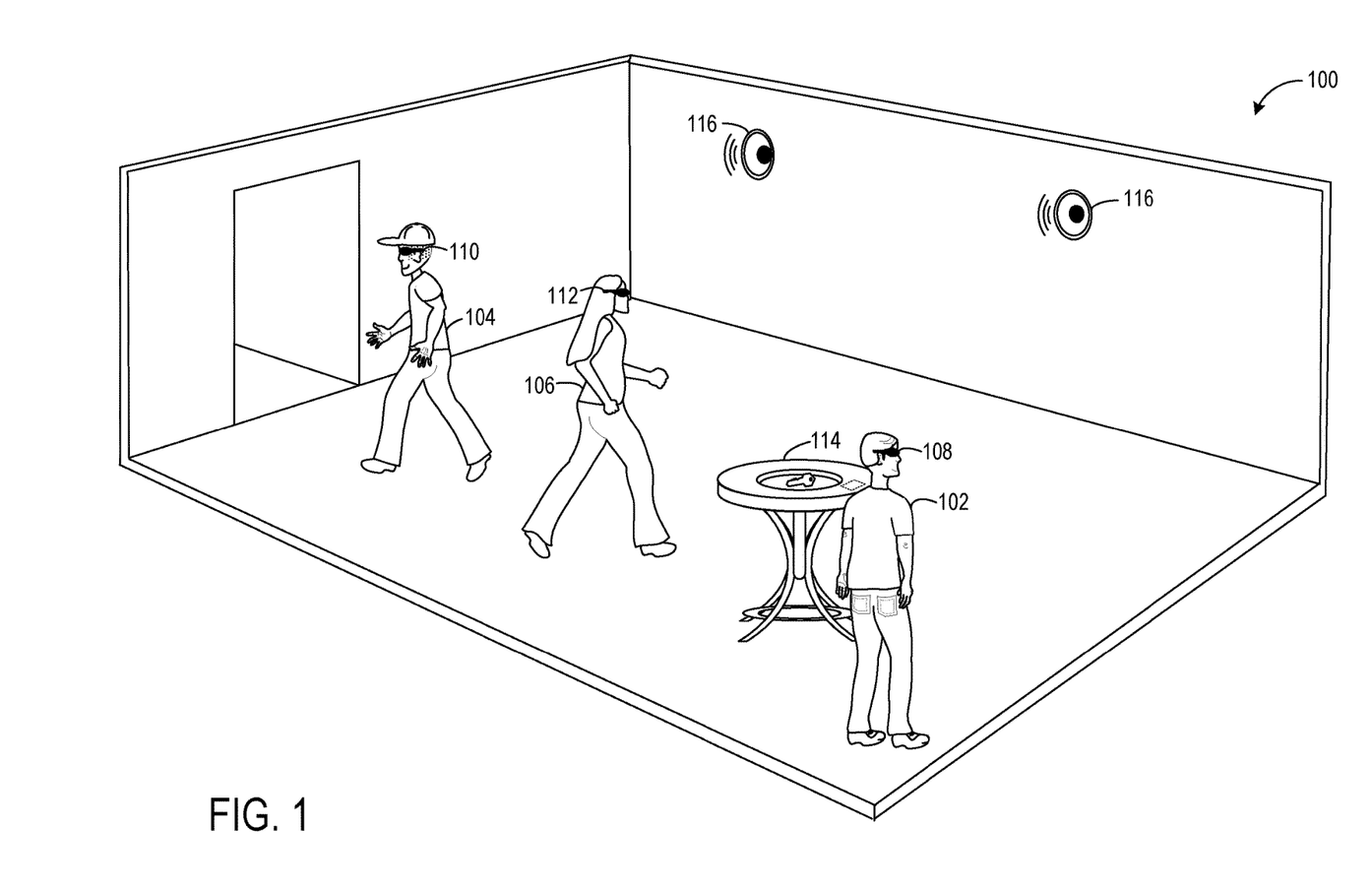
FIG. 1 shows an example location-based holographic experience within an experience space.

FIG. 1 shows an example use environment 100 in which users 102, 104, and 106 respectively wearing head-mounted display devices (HMDs) 108, 110, and 112 are navigating a portion of an example location-based holographic experience associated with an experience space. As described in more detail below, holographic objects may be displayed throughout the holographic experience to provide an interactive, guided path within the experience space, which may be optionally customizable to each individual user. Each holographic object may be associated with a corresponding location in the experience space, such that a selected holographic object will be displayed in response to a HMD meeting a predetermined position-based condition for that holographic object.

Each HMD 108, 110, and 112 includes one or more position sensors configured to acquire sensor data relating to a position of the HMD within the experience space. Examples of such position sensors include accelerometers, gyroscopic sensors, and global positioning system (GPS) sensors. The position sensors help to determine the position, e.g. location and orientation, of the HMD within the experience space, and thus may be utilized to display holographic objects at corresponding locations, as described below.

Each of the HMDs 108, 110, and 112 may also optionally include one or more outward-facing image sensors configured to acquire image data of the experience space. Examples of such image sensors include, but are not limited to, depth image sensors (e.g. time-of-flight, structured light camera(s), and/or stereo camera arrangements) and two-dimensional image sensors (e.g. RGB and/or grayscale sensors). Such image sensor(s) may be configured to detect images in visible, infrared and/or other suitable wavelength range(s). The acquired image data may be utilized to obtain a mapped representation of the experience space, to update the mapped representation, and/or to track the position of real world objects for use in presenting holographic objects at appropriate locations and with appropriate occlusion effects within the experience space, as described below. For example, each HMD may be configured to obtain a three-dimensional surface reconstruction mesh of the experience space by constructing the mesh using acquired depth data. In other examples, an HMD may retrieve a previously constructed, stored mapped representation of the experience space, e.g. from a storage subsystem residing locally on the HMD or from a remote computing system (e.g. a server for the holographic experience, a remote imaging device, or another HMD).

While shown in FIG. 1 in the context of head-mounted display devices, a location-based holographic experience may be presented via any other suitable display devices, including but not limited to other wearable display devices, non-wearable display devices, mobile display devices, projection systems, devices configured to connect to one or more display(s), and other devices configured to display virtual content to a user. Such display devices may or may not include a see-through display, and may be configured to display a completely virtual environment to users.

The HMDs 108, 110, and 112 may obtain data for the holographic experience, including content for display, from any suitable source, such as from a remote server over a network, from one or more peer computing devices (e.g. other HMDs), or from local storage. The HMDs 108, 110, and 112 may obtain data prior to beginning a holographic experience, or may obtain data in real time as users proceed throughout the holographic experience. Each HMD may display holographic objects in a variety of manners. For example, a holographic object may be displayed in a world-locked view relative to a real world environment, such that the holographic object is displayed as positionally fixed relative to real world objects. As another example, a holographic object may be displayed in a device-locked view, such that its position is fixed relative to the HMD display.

Figure 2:
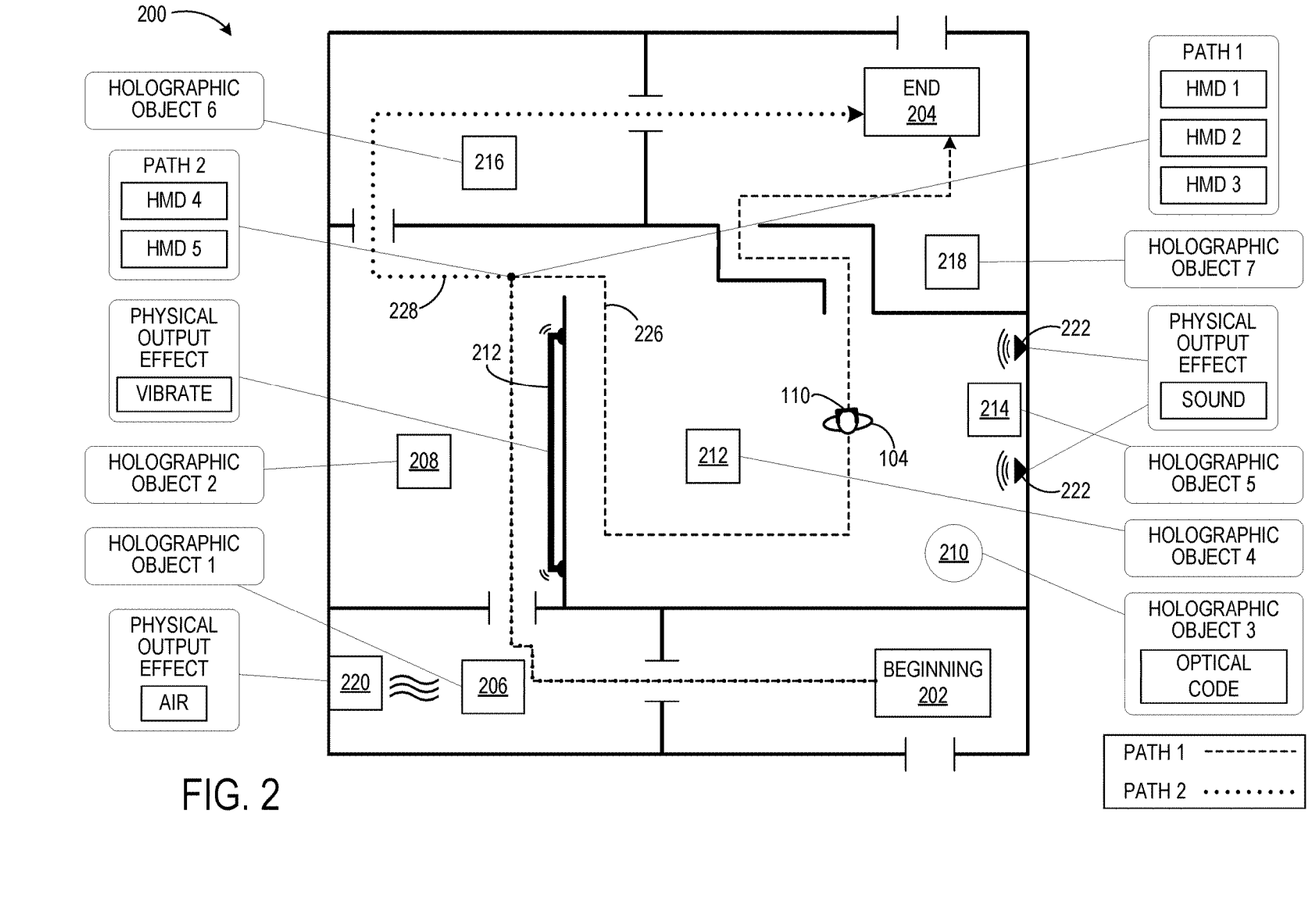
FIG. 2 shows schematic depictions of an example experience space and data related to an example location-based holographic experience associated with the experience space.

FIG. 2 shows a schematic view of an example experience space 200 for the presentation of an associated holographic experience, and depicts holographic experience data corresponding to various locations and/or objects within the experience space 200. The holographic experience associated with the experience space 200 includes a beginning location 202 and an end location 204, such that users navigating through the holographic experience may follow a path extending from the beginning location 202 to the end location 204. FIG. 2 also shows the user 104 wearing the HMD 110 as an example of a user navigating the experience space 200.

In a location-based holographic experience, holographic objects may be displayed by HMDs within the experience space 200 as the corresponding locations for those holographic objects are approached or reached by users of the HMDs. Thus, the HMD 110 is configured to monitor its position within the experience space 200 via position sensor data, and to detect whenever the position of the HMD 110 meets a position-based condition regarding a holographic object. In the example of FIG. 2, the experience space 200 includes locations 206, 208, 210, 212, 214, 216, and 218 having associated holographic objects 1 through 7, respectively. The locations 206, 208, 210, 212, 214, 216, and 218 each may correspond to the location of a real-world object within the experience space 200, or to a location within the experience space independent of any real-world object(s) that may be found at the location.

The HMD 110 may be configured to display holographic objects based upon any suitable position-related condition. For example, the HMD 110 may display holographic object 1 when the HMD is within a threshold distance of location 206, when the HMD 110 has entered the room in which the location 206 resides, when the HMD 110 is in an orientation that is facing the corresponding location 206, when the location 206 is within a field of view of the HMD 110, and/or when an optical code at a location is detectable by the HMD 110. A holographic object also may be displayed in the experience space 200 in response to other triggers than position-based conditions, such as a time-based condition. Further, an appearance of a displayed holographic object may be dynamically updated as the position of the HMD 110 changes with respect to the corresponding location. For example, where a holographic object displays a distance to a location of interest in the experience, the distance displayed may update as the user moves closer to or farther from the location of interest.

The experience space 200 further may be configured to complement the holographic experience by outputting physical effects to accompany the display of selected holographic objects. FIG. 2 shows example physical effect output devices 220, 222, and 224, as a fan, a vibrating rail, and pair of speakers. The physical effect output devices 220, 222, and 224 are configured to output physical effects, e.g. blasts of air, vibrations, and sounds to accompany the display of holographic objects 1, 2, and 3 when triggered based upon their corresponding locations 206, 210, and 214 being reached. Any suitable physical effects may be utilized in the holographic experience, including but not limited to audio, visual, tactile, and olfactory physical effects. Such physical effect outputs may be triggered by signals sent from the HMD 110 based upon HMD position, or may be triggered by a system server in communication with the HMD and the physical effect output devices based upon location data provided by the HMD to the server.

In some examples, a location-based holographic experience may be configured such that different users navigating the experience space 200 may be provided with different guidance information along different paths. FIG. 2 shows "Path 1" at 226 and "Path 2" at 228. Each path extends from the beginning location 202 to the end location 204, but take different routes for at least part of the holographic experience. FIG. 2 depicts HMD 1, HMD 2, and HMD 3 as being designated to take Path 1, and HMD 4 and HMD 5 as being designated to take Path 2. As such, HMD 1, HMD 2, and HMD 3 may receive and present a different set of holographic objects (holographic objects 1, 2, and 6) than HMD 4 and HMD 5 along Path 2 (holographic objects 1, 2, 3, 4, 5, and 7).

Location-based holographic objects may have any suitable appearance and/or convey any suitable information for a location-based holographic experience. For example, some holographic objects may be configured to present guidance information leading users to a location within the experience space, to direct users to look at a particular object, and/or instructions to interact with one or more objects within the experience space. As non-limiting examples, guidance information to lead users throughout the experience space may include directions to go to a specified next location, a remaining distance to a next location, a time remaining to reach a next location, commands to face a certain direction, gaze commands, and the like. Such guidance information may be presented as holographic text and/or visual markers (e.g. arrows, path lines, targets), which may optionally be accompanied by audio instructions. Holographic objects also may augment the appearance of physical objects and/or locations within the experience space, rather than providing guidance information.

Further, in some examples holographic objects may be personalized to individual users. For example, guidance information may be provided to a first user to take the first user on one path, while different guidance information may take a second user on another, different path. In some examples, the second user may be taken on a different path based on differences in the second user's navigation through the experience space from that of the first user. For instance, where the first user and the second user are initially guided along a same path, the second user may, either accidentally or purposefully, end up at a location different from that of the first user. The second user may accordingly be provided with personalized guidance information to lead the second user back onto the original path, or may be taken along a completely different path from that point on. In another instance, the second user may choose to interact with a particular object in the experience space, thereby revealing an alternative (e.g. secret) location or path.

Figure 3A:
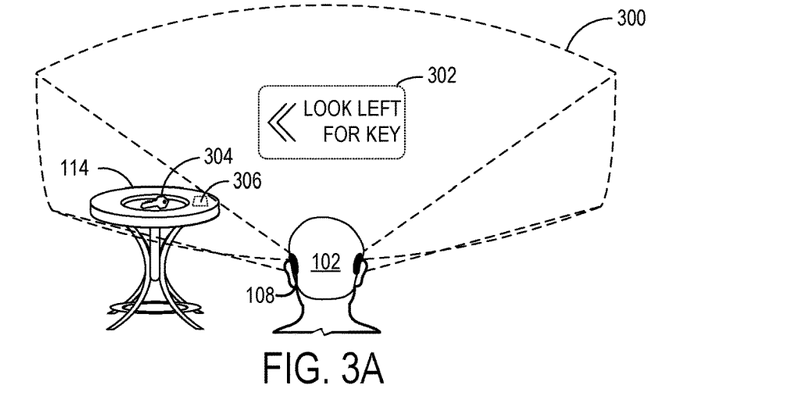
FIGS. 3A-3C show example views of the experience space of FIG. 1 as viewable through head-mounted display devices.
Figure 3B:
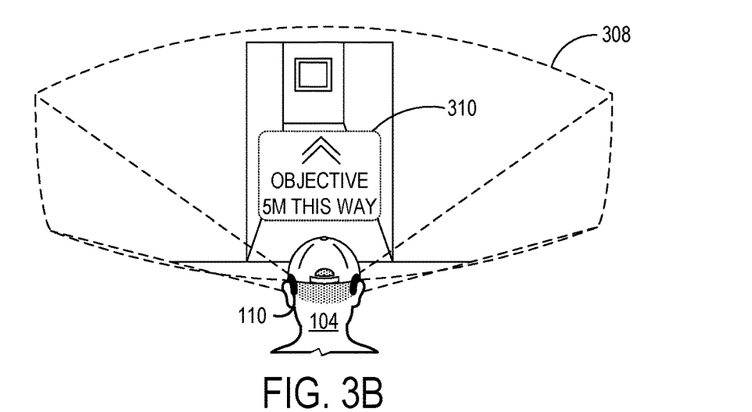
Figure 3C:
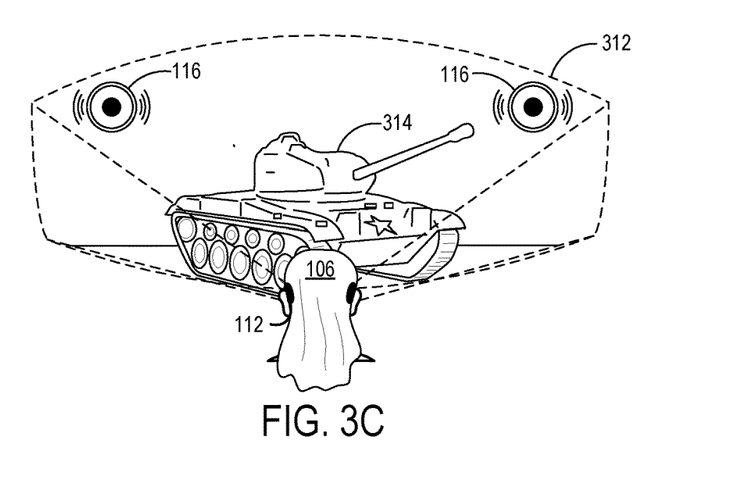

FIGS. 3A-3C show example perspective views of the use environment 100 within the experience space as experienced by users 102, 104, and 106, respectively, within the holographic experience. First, FIG. 3A shows a portion of the use environment 100 as viewable through the HMD 108, indicated schematically via field-of-view 300. Here, the field-of-view 300 includes a partial view of a real-world table 114 with a key 304 to the left of the user 102 in the experience space, as well as a holographic object 302 displaying information guiding the user 102 to look toward the left for the key 304.

The holographic object 302 may be displayed in response to the HMD 108 meeting a position-based condition. For example, the holographic object 302 may be displayed in response to the HMD meeting a positional condition relative to a predetermined location of the table 114, a predetermined location of the key 304, a location of the table or key as determined from image data acquired during the holographic experience (e.g. when the table is currently in the field of view 200), a predetermined location within the experience space without reference to the table or key location, an orientation of the HMD 108 relative to the table/key/location, etc.

Where the position-based condition is referenced to an object such as the table 304 or key 306, the HMD 108 may be configured to track the object in real time using image data acquired via outward-facing image sensors, e.g. via object recognition techniques or optically-readable label(s) 306 affixed to the object. In some examples, an optically-readable label 306 may be an infrared-reflective tag that is detectable by the HMD 108, or otherwise designed to appear inconspicuous to the user 102 but still have sufficient contrast to be detectable by the HMD 108. Real-time tracking of real-world objects may help to ensure that holographic objects tied to physical object are displayed appropriately when physical objects are moved.

FIG. 3B shows another portion of the use environment 100 within the experience space as viewable through the HMD 110, indicated schematically via field-of-view 308, where the user 104 is facing a hallway. The HMD 110 is displaying a holographic object 310 that provides guidance information regarding a direction and a remaining distance between the HMD 110 and a target location within the holographic experience (e.g. the end of the hallway). The holographic object 206 may be displayed, for example, in response to the HMD 110 being within a threshold distance of the end of the hallway, facing the hallway, or meeting another suitable position-based condition. As mentioned above, holographic objects may also be updated to reflect changes in the HMD 110 position with respect to an object or location in the holographic experience. Thus, in this example, the holographic object 310 may be dynamically updated to change the displayed remaining distance as the user 104 moves closer toward the end of the hallway.

Holographic objects may be dynamically updated in other ways as well. As another example, a HMD may be configured to display a holographic object guiding a user to look at another hologram, such as a holographic window initially displayed as shut that then opens to reveal a holographic scene. As another example, in FIG. 3A the holographic object 302 may update to display different information in response to detecting that the user 102 has taken the key 304.

As described above, physical effects may accompany the display of some holographic objects in a location-based holographic experience. FIG. 3C illustrates a field-of-view 312 within the experience space in which the user 106 is facing a set of speakers 116 and is viewing a displayed holographic object 314. The speakers 116 may be triggered to output sounds to accompany the display of the holographic object 314.

Holographic objects may be displayed in an experience space using occlusion effects such that holographic objects are appear to have a desired spatial relation to physical objects. Any suitable methods may be used to determine how to occlude a view of a physical object with a holographic object, or vice versa. In some examples, a HMD may utilize a pre-mapped representation of the experience space that comprises surface reconstruction mesh representations of physical objects in the experience space, which may be used to determine whether to occlude any portions of a displayed holographic object. Such a map also may be constructed in real-time via depth information obtained by a depth sensor on the HMD. As an example of how such physical object geometrical data may be used, where a geometrical representation of a real world table is available, a holographic object may be displayed to appear as located on top of the table and thus appropriately unoccluded by the table when viewed by a user from a perspective above the table, while the same holographic object may be displayed as being occluded by the table when the user crouches down to look up at the holographic object through the table.

Figure 4:
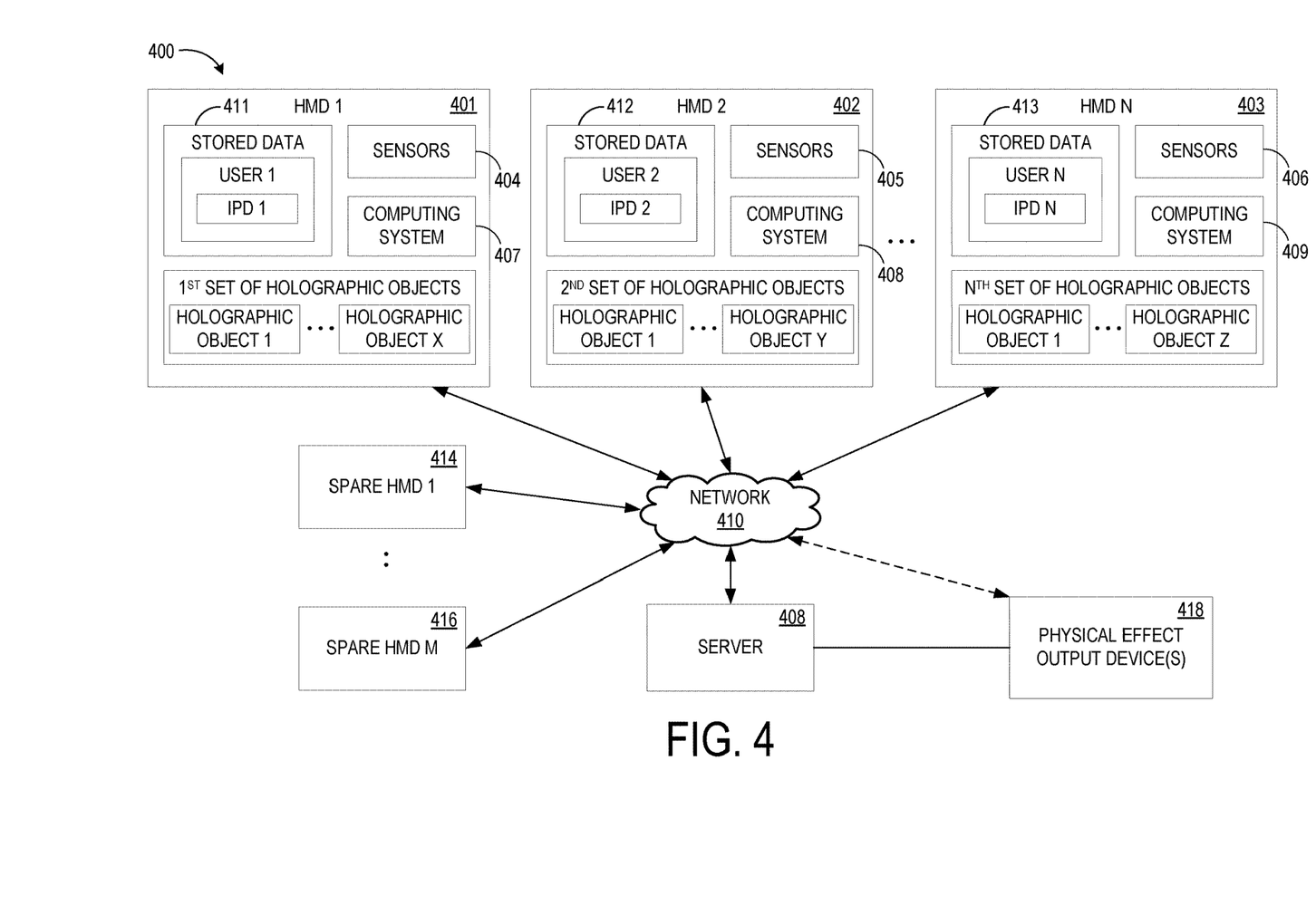
FIG. 4 shows a block diagram of an example system configured to provide a holographic experience associated with an experience space.

FIG. 4 shows a diagram of an example system 400 configured to provide to a plurality of users a holographic experience associated with an experience space. The system 400 includes a plurality of HMDs, shown as HMD 1 401, HMD 2 402, and HMD N 403. The HMDs include sensors 404, 405, and 406 and computing systems 407, 408, and 409 respectively, as described in more detail below. The HMDs are configured to communicate wirelessly via a data communications network 410 to obtain from a server 408 information regarding holographic objects to display during the presentation of the location-based holographic experience. The network 410 may comprise any suitable type of network or combination of networks for communication of data between devices in system 400.

Either prior to the start of, or during presentation of, a holographic experience, each HMD obtains data representing a set of holographic objects for presentation. In some examples, each HMD may receive a same set of holographic objects such that each user experiences the same holographic experience. In other examples, some HMDs may receive different sets of holographic objects from the server 408, where the different sets may comprise some common holographic objects or completely different holographic objects. Example sets of holographic objects are illustrated in FIG. 4 as a first set, a second set, and an nth set of holographic objects respectively for HMD 1, HMD 2, and HMD N. The HMDs also may obtain and store user data 411, 412, and 413, each relating to physical characteristics of a user of the HMD, as such data may be used to customize a presentation of holographic objects for a user. In the depicted example, each HMD includes a stored interpupillary distance (IPD) measurement for an associated user for use in rendering stereoscopic imagery at appropriate relative left eye and right eye perspectives. User IPDs may be initially obtained in any suitable manner, including but not limited to a user-specific calibration process and manual entry.

User IPDs also may be communicated to the server 408 and stored for each user. This may allow a user's IPD to be communicated to a replacement HMD without needing to perform an IPD calibration if the need arises during a holographic experience. As such, FIG. 4 illustrates a plurality of spare "backup" HMDs 1 through M, shown at 414 and 416, that can be switched out during a holographic experience as needed. As user data for each HMD may be stored at the server for the presentation of a holographic experience, user data (including but not limited to IPD data and a selected set of holographic objects) may be easily provided to a backup HMD when it is brought into service for a user. Spare HMDs may be stored at selected locations in a holographic experience, carried by staff members during presentation of a holographic experience, or be made available in any other suitable manner. When a HMD is switched with a spare HMD, the server 408 may be configured to appropriately update the spare HMD with relevant user information, such as an updated IPD and holographic object set, in order to display holographic objects properly for the user.

The system 400 optionally may include one or more physical effect output device(s) 418. Each of HMDs 1 through N and also spare HMDs 1 through M may be configured to send a request to the sever 408 to trigger a physical effect output within the experience space associated with a selected holographic object. The physical effect output device(s) 418 may include one or more fans, electric motors, speakers, displays, lights, scent dispensers, fog/smoke machines, and other suitable devices. The server 408 may then then in response send an instruction to a physical effect output device located within the experience space to output a physical effect to accompany the selected holographic object.

Figure 5A:
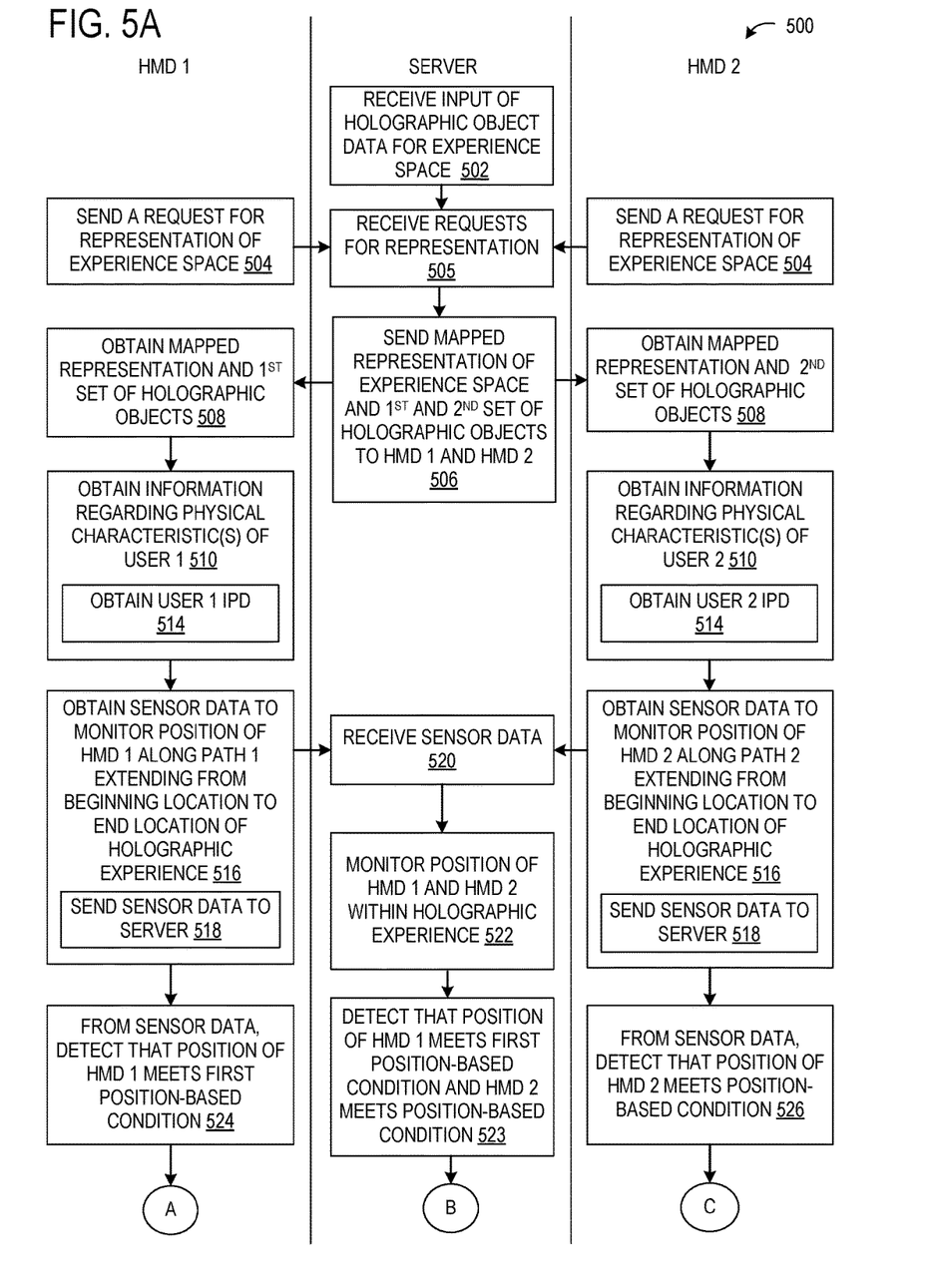
FIGS. 5A-5B show flow diagrams illustrating an example method of providing a location-based holographic experience.
Figure 5B:
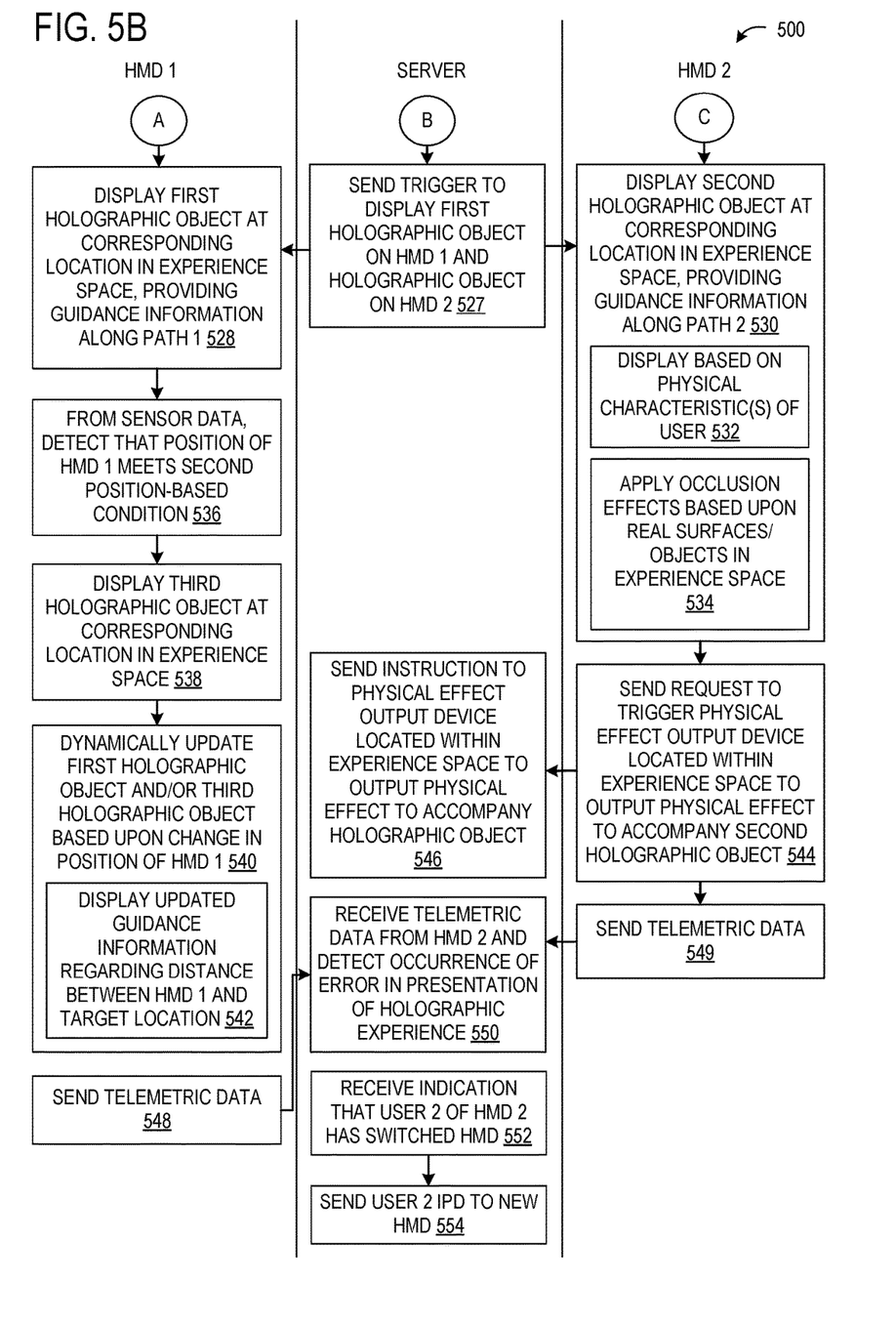

FIGS. 5A-5B illustrate an example method 500 of providing a holographic experience associated with an experience space, enacted via a system having a server and one or more HMDs, represented by "HMD 1" and "HMD 2." In other examples, a holographic experience may be presented via a single HMD in a similar manner as either of HMDs 1 or 2 of FIG. 5. At 502, the server receives an input of a plurality of holographic object data for a holographic experience to be provided in an experience space. As described above, each holographic object may be associated with a corresponding location in the experience space and at least some holographic objects may provide guidance information along a path extending from a beginning location to an end location of the holographic experience. Some objects may be associated with different paths through the experience than other objects. Further, each holographic object further may have associated position-based condition(s) configured to trigger the display of the holographic object when met by an HMD.

At 504, HMD 1 and HMD 2 each sends a request for a representation of the experience space, such as a surface reconstruction mesh representation or other suitable three-dimensional representation. In response, at 505, the server receives the requests for the representation and, at 506, sends the representation of the experience space to each of HMD 1 and HMD 2. In other examples, each of HMD 1 and HMD 2 may locally construct representations of the experience space as they travel through the experience space, e.g. via depth data as acquired via depth sensors.

At 506, the server also sends a first set of holographic objects to HMD 1, and sends a second a set of holographic objects to HMD 2. The first set of holographic objects may be at least partially non-overlapping with the second set of holographic objects, such that the first set and the second set provide different guidance information at a portion of the holographic experience. In other examples, the first and second set may comprise the same holographic objects. In yet other examples, the first and second set may be non-overlapping. Each of HMD 1 and HMD 2 receives its respective set of holographic objects at 508.

At 510, each of HMD 1 and HMD 2 obtains information regarding one or more physical characteristic(s) of "User 1" and "User 2" respectively. Obtained physical characteristics may include user interpupillary distances, at 514, and/or other suitable user data. Such physical characteristics may be determined from data obtained via sensors on the HMDs, may be obtained via user input, or may be received from the server. Such data may help to properly display stereoscopic holographic objects to individual users.

Continuing, at 516, each HMD acquires sensor data via one or more position sensors to monitor a position of the HMD along the path of the holographic experience. Such sensing may be performed periodically or continuously along the holographic experience. The sensor data from each HMD is then sent to the server, at 518, where it is received at 520. Using the sensor data, the server also may monitor the position of each of HMD 1 and HMD 2 within the holographic experience, at 522.

At 524, HMD 1 detects from sensor data that the position of HMD 1 meets a first position-based condition. Likewise, at 526, HMD 2 detects from sensor data that the position of HMD 2 meets a position-based condition 526. In other examples, the server may detect these conditions from sensor data received from the HMDs. These position-based conditions may be the same or different, and may take any suitable form, including but not limited to those described above.

Continuing with FIG. 5B, in response to meeting the position-based condition, HMD 1 displays a first holographic object at a corresponding location in the experience space, at 528, while HMD 2 displays a second holographic object at a corresponding location in the experience space, at 530, wherein the locations for each holographic object may be the same or different. The first and second holographic object may be the same object corresponding to a same location, may be different objects corresponding to a same location, or may be different objects corresponding to different locations. Each holographic objects may provide guidance information. For example, the first holographic object presented by HMD 1 may provide guidance information along Path 1, while the second holographic object presented by HMD 2 may provide guidance information along Path 2. Each holographic object may be displayed based on one or more physical characteristic(s) of a user (e.g. at a location or perspective determined based upon a height of a user). Further, occlusion effects may be applied based upon the surfaces/objects in the experience space, at 534.

At 536, HMD 1 detects that the position of HMD 1 meets a second position-based condition. In response, the HMD 1 displays a third holographic object at a corresponding location for the third holographic object in the experience space, at 538. HMD 1 may further dynamically update one or more of the first holographic object and the third holographic object based upon a change in the position of HMD 1, at 540. For example, as described above with regard to FIG. 3B, dynamically updating a holographic object may include displaying updated guidance information regarding a distance between HMD 1 and target location, at 542.

As previously described, an experience space may include physical effect output devices to output physical effects to accompany selected holographic objects. As such, method 500 includes, at 544, HMD 2 sending a request to the server trigger a physical effect output device located within the experience space to output a physical effect. The server receives the request, and at 546 sends an instruction to the physical effect output device to output the physical effect. In other examples, the server may automatically send instructions to physical effect output devices based on monitoring the positions of the HMDs within the holographic experience. In yet other examples, an HMD may communicate directly (e.g. wirelessly) with a physical effect output device to trigger the output of a physical effect.

In some examples, HMDs in a location-based holographic experience may send telemetric data to the server throughout an experience for diagnostic purposes. This is indicated for HMD 1 at 548 and HMD 2 at 549. Such telemetric data may be used by the server, for example, to ensure that HMDs are operating correctly. In the event that an HMD is not operating correctly, a user may swap the HMD for a different one. In this event, the server may receive data indicating the change at 552, and may send the previously-stored IPD for that user to the replacement HMD, at 554.

Figure 6:
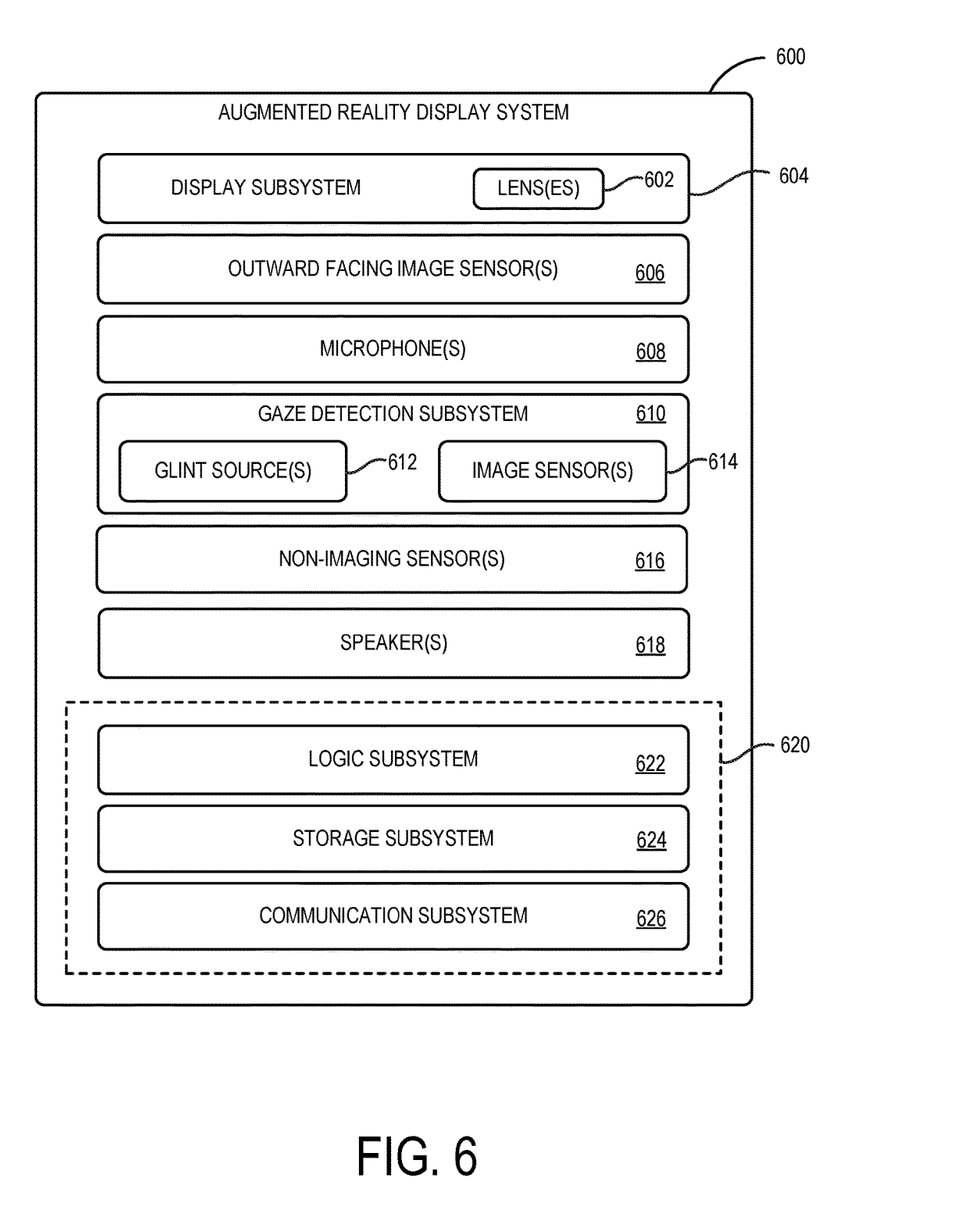
FIG. 6 shows a block diagram of an example mixed reality display system.

FIG. 6 shows a block diagram of an example augmented reality display system 600 that may be used to implement the above-described scenarios. The head-mounted display devices 108, 110, 112 each represents an example implementation of the augmented reality display system 600, though it will be understood that the display system 600 may take any other suitable form. The display system 600 includes one or more lenses 602 that form a part of a display subsystem 604, e.g. a see-through display subsystem, such that images may be displayed via the lenses 602 (e.g. via projection onto the lenses 602, waveguide system(s) incorporated into the lenses 602, and/or in any other suitable manner). The display subsystem 604 may include a backlight and a microdisplay, such as liquid-crystal display (LCD) or liquid crystal on silicon (LCOS) display, in combination with one or more light-emitting diodes (LEDs), laser diodes, and/or other light sources. In other examples, the display subsystem 604 may utilize quantum-dot display technologies, active-matrix organic LED (OLED) technology, and/or any other suitable display technologies.

The augmented reality display system 600 further includes one or more outward-facing image sensors 606 configured to acquire images of a real-world environment being viewed by a user, and may include one or more microphones 608 configured to detect sounds, such as voice commands from a user or ambient sounds. The outward-facing image sensors 606 may include one or more depth sensor(s) and/or one or more two-dimensional image sensor(s) (e.g. RGB image sensors).

The augmented reality display system 600 may further include a gaze detection subsystem 610 configured to detect a gaze of a user for detecting user input interacting with holographic objects, for example when the augmented reality display system 600 is implemented as a head-mounted display system, as mentioned above. The gaze detection subsystem 610 may be configured to determine gaze directions of each of a user's eyes in any suitable manner. In this example, the gaze detection subsystem 610 comprises one or more glint sources 612, such as infrared light sources configured to cause a glint of light to reflect from each eyeball of a user, and one or more image sensor(s) 614, such as inward-facing sensors, configured to capture an image of each eyeball of the user. Changes in glints from the user's eyeballs and/or a location of a user's pupil as determined from image data gathered via the image sensor(s) 614 may be used to determine a direction in which to project gaze lines from the user's eyes. Further, a location at which gaze lines projected from the user's eyes intersect the external display may be used to determine an object at which the user is gazing (e.g. a displayed holographic object and/or real background object). The gaze detection subsystem 610 may have any suitable number and arrangement of light sources and image sensors. In other examples, the gaze detection subsystem 610 may be omitted.

The augmented reality display system 600 also may include additional sensors. For example, the augmented reality display system 600 may include non-imaging sensor(s) 616, examples of which may include but are not limited to an accelerometer, a gyroscopic sensor, a global positioning system (GPS) sensor, and an inertial measurement unit (IMU). Such sensor(s) may help to determine the position, location, and/or orientation of the augmented reality display system 600 within a real world experience space, which may be used to help appropriately display holographic objects at corresponding locations in a holographic experience.

Motion sensors, as well as the microphone(s) 608 and the gaze detection subsystem 610, also may be employed as user input devices, such that a user may interact with the augmented reality display system 600 via gestures of the eye, neck and/or head, as well as via verbal commands. It will be understood that sensors illustrated in FIG. 6 are shown for the purpose of example and are not intended to be limiting in any manner, as any other suitable sensors and/or combination of sensors may be utilized.

The augmented reality display system 600 further includes one or more speaker(s) 618, for example to provide audio outputs to a user for user interactions. The augmented reality display system 600 further includes a controller 620 having a logic subsystem 622, a storage subsystem 624, and a communication subsystem 626 in communication with the various sensors, the gaze detection subsystem 610, the display subsystem 604, and/or other components. The components of the controller 620 are discussed in more detail below with regard to FIG. 7.

It will be appreciated that the depicted augmented reality display system 600 is described for the purpose of example, and is not meant to be limiting. It is to be further understood that the augmented reality display system 600 may include additional and/or alternative sensors, cameras, microphones, input devices, output devices, etc. than those shown. For example, the display system 600 may be implemented as a virtual reality display system rather than an augmented reality system. Additionally, the physical configuration of a display device and its various sensors and subcomponents may take a variety of different forms without departing from the scope of this disclosure. Further, it will be understood that the methods and processes described herein may be implemented as a computer-application program or service, an application-programming interface (API), a library, and/or other computer program product. Such computer program products may be executable locally on the augmented reality display system 600 or other suitable display system, or may be executable remotely on a computing system in communication with the augmented reality display system 600.

Figure 7:
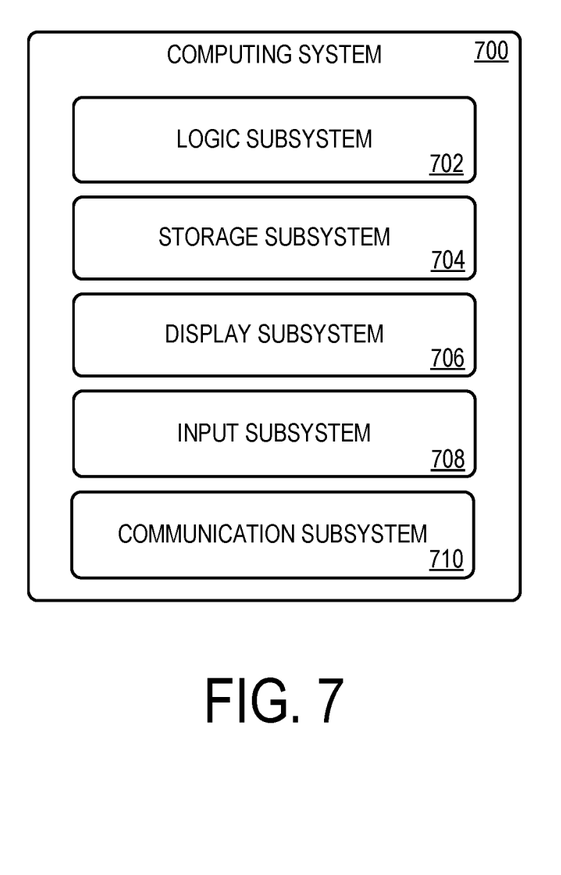
FIG. 7 shows a block diagram of an example computing system.

FIG. 7 schematically shows a non-limiting embodiment of a computing system 700 that can enact one or more of the methods and processes described above. The computing system 700 is shown in simplified form. The computing system 700 may take the form of one or more personal computers, server computers, tablet computers, home-entertainment computers, network computing devices, gaming devices, mobile computing devices, mobile communication devices (e.g., smart phone), and/or other computing devices, including but not limited to the wearable devices and/or server devices described above.

The computing system 700 includes a logic subsystem 702 and a storage subsystem 704. The computing system 700 may optionally include a display subsystem 706, input subsystem 708, communication subsystem 710, and/or other components not shown in FIG. 7.

The logic subsystem 702 includes one or more physical devices configured to execute instructions. For example, the logic subsystem 702 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem 702 may include one or more processors configured to execute software instructions. Additionally or alternatively, the logic subsystem 702 may include one or more hardware or firmware logic machines configured to execute hardware or firmware instructions. Processors of the logic subsystem 702 may be single-core or multi-core, and the instructions executed thereon may be configured for sequential, parallel, and/or distributed processing. Individual components of the logic subsystem 702 optionally may be distributed among two or more separate devices, which may be remotely located and/or configured for coordinated processing. Aspects of the logic subsystem 702 may be virtualized and executed by remotely accessible, networked computing devices configured in a cloud-computing configuration.

The storage machine subsystem 704 includes one or more physical devices configured to hold instructions executable by the logic subsystem 702 to implement the methods and processes described herein. When such methods and processes are implemented, the state of the storage subsystem 704 may be transformed—e.g., to hold different data.

The storage subsystem 704 may include removable and/or built-in devices. The storage subsystem 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. The storage subsystem 704 may include volatile, nonvolatile, dynamic, static, read/write, read-only, random-access, sequential-access, location-addressable, file-addressable, and/or content-addressable devices. The storage subsystem 704 comprises instructions stored thereon that are executable by the logic subsystem 702, for example, to receive and interpret inputs from the sensors, to identify location and movements of a user, to identify real objects in an augmented reality field of view and present augmented reality imagery therefore, to detect objects located outside a field of view of the user, and to present indications of positional information associated with objects located outside the field of view of the user, among other tasks.

It will be appreciated that the storage subsystem 704 includes one or more physical devices. However, aspects of the instructions described herein alternatively may be propagated by a communication medium (e.g., an electromagnetic signal, an optical signal, etc.) that is not held by a physical device for a finite duration.

Aspects of the logic subsystem 702 and storage subsystem 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 700 implemented to perform a particular function. In some cases, a program may be instantiated via the logic subsystem 702 executing instructions held by the storage subsystem 704. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

When included, the display subsystem 706 may be used to present a visual representation of data held by the storage subsystem 704. This visual representation may take the form of a graphical user interface (GUI). As the herein described methods and processes change the data held by the storage subsystem 704, and thus transform the state of the storage machine, the state of the display subsystem 706 may likewise be transformed to visually represent changes in the underlying data. The display subsystem 706 may include one or more display devices utilizing virtually any type of technology. Such display devices may be combined with the logic subsystem 702 and/or the storage subsystem 704 in a shared enclosure, or such display devices may be peripheral display devices.

When included, the input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, the communication subsystem 710 may be configured to communicatively couple computing system 700 with one or more other computing devices. The communication subsystem 710 may include wired and/or wireless communication devices compatible with one or more different communication protocols. As non-limiting examples, the communication subsystem 710 may be configured for communication via a wireless telephone network, or a wired or wireless local- or wide-area network. In some embodiments, the communication subsystem 710 may allow the computing system 700 to send and/or receive messages to and/or from other devices via a network such as the Internet.

Another example provides a head-mounted display device configured to provide a holographic experience associated with an experience space, the head-mounted display device comprising a see-through display, one or more position sensors configured to provide data relating to a position of the head-mounted display device within the experience space, a logic subsystem, and a storage subsystem comprising instructions executable by the logic subsystem to obtain data representing a plurality of holographic objects, each holographic object being associated with a corresponding location in the experience space, acquire sensor data via the one or more position sensors to monitor the position of the head-mounted display device along a path extending from a beginning location to an end location of the holographic experience, from the sensor data, detect that the position of the head-mounted display device meets a first position-based condition regarding a first holographic object, and in response, display the first holographic object at a corresponding location for the first holographic object in the experience space via the display device, the first holographic object providing guidance information along the path of the holographic experience. The instructions may be additionally or alternatively executable to, from the sensor data, detect that the position of the head-mounted display device meets a second position-based condition regarding a second holographic object, and in response, display the second holographic object at a corresponding location for the second holographic object in the experience space via the display device, the second holographic object providing further guidance information along the path of the holographic experience. The instructions may be additionally or alternatively executable to dynamically update the first holographic object based upon a change in position of the display device within the holographic experience as detected via the sensor data. The instructions may be additionally or alternatively executable to dynamically update the first holographic object by displaying updated guidance information regarding a distance between the display device and a target location within the holographic experience. The instructions may be additionally or alternatively executable to send a request to trigger a physical effect output device located within the experience space to output a physical effect associated with a selected holographic object. The instructions may be additionally or alternatively executable to display the first holographic object to avoid occlusion of the first holographic object by other objects in the experience space. The head-mounted display device may additionally or alternatively include one or more image sensors, and the instructions may be additionally or alternatively executable to detect via image data acquired by the one or more image sensors an optically-readable label within the holographic experience, and display a second holographic object based upon a location of the optically-readable label. The instructions may be additionally or alternatively executable to send at least a portion of the sensor data to a remote server. The instructions may be additionally or alternatively executable to obtain information regarding one or more physical characteristics of a user of the head-mounted display device and display the first holographic object based on the one or more physical characteristics of the user. The instructions may be additionally or alternatively executable to display the first holographic object based on one or more of a height and an interpupillary distance of the user.

Another example provides, on a display device, a method of providing a holographic experience associated with an experience space, the display device comprising a computing device and one or more position sensors, the method comprising obtaining data representing a plurality of holographic objects associated with the holographic experience, each holographic object being associated with a corresponding location in the experience space, monitoring sensor data from the one more position sensors to monitor motion of the display device along a path extending from a beginning location to an end location of the holographic experience, from the sensor data, detecting that the display device meets a first position-based condition with regard to a first holographic object, and in response displaying the first holographic object at a corresponding location in the experience space for the first holographic object via the display device, the first holographic object providing guidance information along the path of the holographic experience, and from the sensor data, detecting that the display device meets a second position-based condition with regard to a second holographic object, and in response displaying the second holographic object at a corresponding location in the experience space for the second holographic object via the display device, the second holographic object providing further guidance information along the path of the holographic experience. The method may additionally or alternatively include dynamically updating one or more of the first holographic object and the second holographic object based upon a change in position of the display device within the holographic experience as detected via the sensor data. The method may additionally or alternatively include sending a request to trigger a physical effect within the experience space to accompany one or more of the first holographic object and the second holographic object based upon the corresponding location in the experience space associated with one or more of the first holographic object and the second holographic object. The method may additionally or alternatively include sending at least a portion of the sensor data to a remote server.

Yet another example provides a computing system configured to facilitate presentation of a holographic experience associated with an experience space via each of a plurality of display devices configured to present the holographic experience, the computing system comprising a communications subsystem configured to connect to each of the plurality of display devices, a logic system, and a storage system having instructions executable by the logic device to receive input of a plurality of holographic objects to be displayed during the holographic experience, each holographic object being associated with a corresponding location in the experience space and providing guidance information along a path extending from a beginning location to an end location of the holographic experience, determine an identity of each display device of the plurality of display devices, send to a first display device a first set of holographic objects selected from the plurality of holographic objects, send to a second display device a second set of holographic objects selected from the plurality of holographic objects, receive sensor data from each display device, the sensor data for each display device comprising data relating to a position of the display device, and based upon the sensor data, monitoring a position of each of the first display device and the second display device within the holographic experience. In this example, the second set of holographic objects may additionally or alternatively be at least partially non-overlapping with the first set of holographic objects such that the first set and the second set provide different guidance information at a portion of the holographic experience. The instructions may be additionally or alternatively executable to send an instruction to a physical effect output device located within the experience space to output a physical effect to accompany a selected holographic object. The instructions may be additionally or alternatively executable to, for each display device of the plurality of display devices, receive an interpupillary distance of a user of the display device and associate the interpupillary distance with the identity of the display device. The instructions may be additionally or alternatively executable to, for a selected display device, receive an indication that a user of the selected display device has switched to a different display device, and send the interpupillary distance associated with the selected display device to the different display device. The instructions may be additionally or alternatively executable to receive telemetric data from one or more display devices of the plurality of display devices upon occurrence of an error in the presentation of the interactive holographic experience.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A head-mounted display device configured to provide a holographic experience associated with an experience space, the head-mounted display device comprising:
a see-through display;
one or more position sensors configured to provide data relating to a position of the head-mounted display device within the experience space, the one or more position sensors comprising a depth image sensor;
a logic subsystem comprising a processor; and
a storage subsystem comprising a storage device storing instructions executable by the processor of the logic subsystem to
obtain a surface reconstruction mesh of the experience space from one or more of the depth image sensor, a server computing device, and the storage device of the storage subsystem, and also obtain, from one or more of the server computing device and the storage device of the storage subsystem, image data representing a plurality of holographic objects, each holographic object being associated with a corresponding location in the experience space based upon the obtained surface reconstruction mesh of the experience space,
control the depth image sensor to acquire sensor data monitor the position of the head-mounted display device along a path extending from a beginning location to an end location of the holographic experience by tracking a position of one or more real-world objects using the sensor data from the depth image sensor and the surface reconstruction mesh of the experience space,
from the sensor data from the depth image sensor, detect that the position of the head-mounted display device meets a first position-based condition regarding a first holographic object, the first position-based condition comprising a threshold distance from the head-mounted display device to a corresponding location for the first holographic object as determined by tracking the position of the one or more real objects using the sensor data from the depth image sensor, and
in response, control the see-through display to display the first holographic object at the corresponding location for the first holographic object in the experience space via the see-through display, the first holographic object providing guidance information along the path of the holographic experience.

2. The head-mounted display device of claim 1, wherein the instructions are further executable to:
from the sensor data, detect that the position of the head-mounted display device meets a second position-based condition regarding a second holographic object, and
in response, display the second holographic object at a corresponding location for the second holographic object in the experience space via the see-through display, the second holographic object providing further guidance information along the path of the holographic experience.

3. The head-mounted display device of claim 1, wherein the instructions are further executable to dynamically update the first holographic object based upon a change in position of the see-through display within the holographic experience as detected via the sensor data.

4. The head-mounted display device of claim 3, wherein the instructions executable to dynamically update the first holographic object comprise instructions executable to display updated guidance information regarding a distance between the see-through display and a target location within the holographic experience.

5. The head-mounted display device of claim 1, wherein the instructions are further executable to send a request to trigger a physical effect output device located within the experience space to output a physical effect associated with a selected holographic object.

6. The head-mounted display device of claim 1, wherein the instructions are further executable to display the first holographic object to avoid occlusion of the first holographic object by other objects in the experience space.

7. The head-mounted display device of claim 1, further comprising one or more image sensors, and wherein the instructions are further executable to detect via image data acquired by the one or more image sensors an optically-readable label within the holographic experience, and display a second holographic object based upon a location of the optically-readable label.

8. The head-mounted display device of claim 1, wherein the instructions are further executable to send at least a portion of the sensor data to a remote server.

9. The head-mounted display device of claim 1, wherein the instructions are further executable to obtain information regarding one or more physical characteristics of a user of the head-mounted display device and display the first holographic object based on the one or more physical characteristics of the user.

10. The head-mounted display device of claim 9, wherein the instructions are executable to display the first holographic object based on one or more of a height and an interpupillary distance of the user.

11. On a display device, a method of providing a holographic experience associated with an experience space, the display device comprising a computing device comprising a storage device and processor, and the display device also comprising one or more position sensors, the one or more position sensors comprising a depth image sensor, the method comprising:
obtaining a surface reconstruction mesh of the experience space from one or more of the depth image sensor, the storage device of the display device, and a remote server;
obtaining from one or more of the storage device of the display device and the remote server data representing a plurality of holographic objects associated with the holographic experience, each holographic object being associated with a corresponding location in the experience space based upon the obtained surface reconstruction mesh of the experience space;
controlling the depth image sensor to acquire sensor data from the depth image sensor to monitor motion of the display device along a path extending from a beginning location to an end location of the holographic experience by tracking a position of one or more real-world objects using the sensor data from the depth image sensor and the surface reconstruction mesh of the experience space;
from the sensor data, detecting that the display device meets a first position-based condition with regard to a first holographic object, the first position-based condition comprising a threshold distance from the display device to a corresponding location for the first holographic object as determined by tracking the position of the one or more real objects using the sensor data from the depth image sensor;
in response, control the display device to display the first holographic object at the corresponding location in the experience space for the first holographic object via the display device, the first holographic object providing guidance information along the path of the holographic experience; and
from the sensor data, detecting that the display device meets a second position-based condition with regard to a second holographic object, and in response displaying the second holographic object at a corresponding location in the experience space for the second holographic object via the display device, the second holographic object providing further guidance information along the path of the holographic experience.

12. The method of claim 11, further comprising dynamically updating one or more of the first holographic object and the second holographic object based upon a change in position of the display device within the holographic experience as detected via the sensor data.

13. The method of claim 11, further comprising sending a request to trigger a physical effect within the experience space to accompany one or more of the first holographic object and the second holographic object based upon the corresponding location in the experience space associated with one or more of the first holographic object and the second holographic object.

14. The method of claim 11, further comprising sending at least a portion of the sensor data to the remote server.

15. A computing system configured to facilitate presentation of a holographic experience associated with an experience space via each of a plurality of display devices configured to present the holographic experience, the computing system comprising:
a communications subsystem configured to connect to each of the plurality of display devices;
a logic system comprising a processor; and
a storage system comprising a storage device having instructions executable by the processor to
receive input of a plurality of holographic objects to be displayed during the holographic experience, each holographic object being associated with a corresponding location in the experience space and providing guidance information along a path extending from a beginning location to an end location of the holographic experience,
determine an identity of each display device of the plurality of display devices,
control the communications subsystem to send to a first display device a first set of holographic objects selected from the plurality of holographic objects,
control the communications subsystem to send to a second display device a second set of holographic objects selected from the plurality of holographic objects, the second set of holographic objects sent to the second display device being at least partially non-overlapping with the first set of holographic objects sent to the first display device,
control the communications subsystem to receive sensor data from each display device, the sensor data for each display device comprising data relating to a position of the display device, and
based upon the sensor data, monitor a position of each of the first display device and the second display device within the holographic experience.

16. The computing system of claim 15, wherein the second set of holographic objects is at least partially non-overlapping with the first set of holographic objects such that the first set and the second set provide different guidance information at a portion of the holographic experience.

17. The computing system of claim 15, wherein the instructions are further executable to send an instruction to a physical effect output device located within the experience space to output a physical effect to accompany a selected holographic object.

18. The computing system of claim 15, wherein the instructions are further executable to, for each display device of the plurality of display devices, receive an interpupillary distance of a user of the display device and associate the interpupillary distance with the identity of the display device.

19. The computing system of claim 18, wherein the instructions are further executable to, for a selected display device, receive an indication that a user of the selected display device has switched to a different display device, and send the interpupillary distance associated with the selected display device to the different display device.

20. The computing system of claim 15, wherein the instructions are further executable to receive telemetric data from one or more display devices of the plurality of display devices upon occurrence of an error in the presentation of the holographic experience.

* * * * *